United States Patent [19]

Skow

[11] Patent Number: 5,496,001

[45] Date of Patent: Mar. 5, 1996

[54] T-38 AIRCRAFT MODIFIED WITH AN F-5 WING

[76] Inventor: Andrew Skow, 2 Dobbin La., Rolling Hills Estates, Calif. 90274

[21] Appl. No.: 188,566

[22] Filed: Jan. 28, 1994

[51] Int. Cl.⁶ .............................. B64C 1/26; B64C 23/06
[52] U.S. Cl. ...................... 244/119; 244/129.1; 244/130; 244/199
[58] Field of Search .................... 244/15, 117 R, 244/119, 129.1, 130, 198, 199

[56] References Cited

U.S. PATENT DOCUMENTS

| 4,381,091 | 4/1983 | Pegram | 244/198 X |
| 4,569,494 | 2/1986 | Sakata | 244/199 |

FOREIGN PATENT DOCUMENTS

| 890601 | 8/1953 | Germany | 244/198 |
| 664288 | 1/1952 | United Kingdom | 244/130 |

*Primary Examiner*—Andres Kashnikow
*Assistant Examiner*—Virna Lissi Mojica
*Attorney, Agent, or Firm*—Blakely, Sokoloff, Taylor & Zafman

[57] ABSTRACT

A T-38 trainer aircraft that is modified to have the wings of an F-5 fighter aircraft. The F-5 wings have leading edge flaps which increase aircraft maneuverability and allow the plane to be landed at a lower speed. The F-5 wing is coupled to existing wing joints of the fuselage by fittings which increase the angle of incidence of the aircraft approximately 2°. The increased angle of incidence provides the pilot with a greater over the cone field of view. The modified T-38 also has a pair of forward strakes located on the leading edge of the aircraft nacelles. The forward strakes further increase the performance of the plane. Attached to the tail of the aircraft are a pair of aft strakes which counteract the pitch created by the forward strakes.

7 Claims, 8 Drawing Sheets

T-38 AIRCRAFT MODIFIED WITH AN F-5 WING

BACKGROUND OF THE INVENTION

1. Field of the Invention

The present invention relates to an aircraft which has an F-5 wing attached to a T-38 fuselage.

2. Description of Related Art

Figure 1:
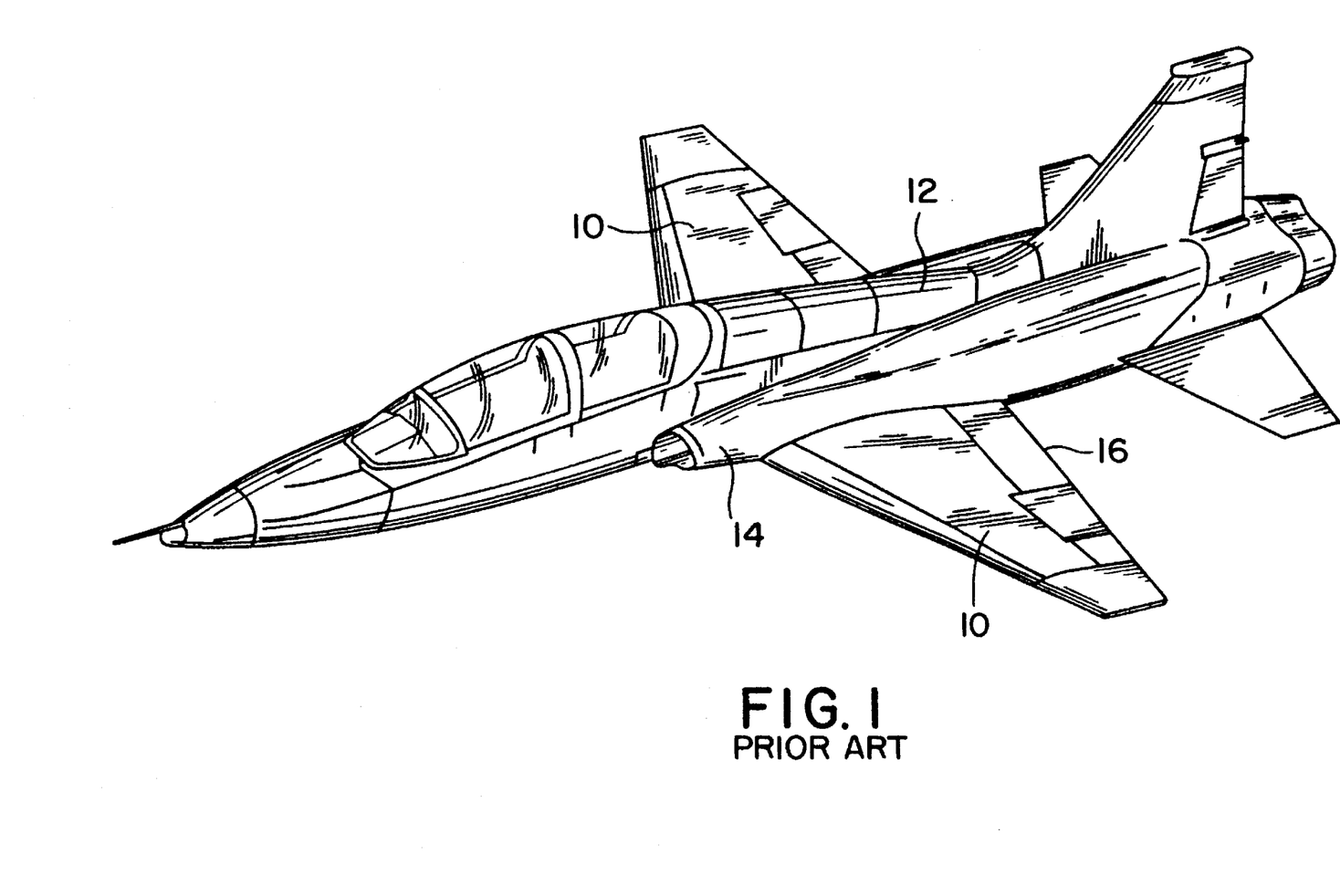
FIG. 1 is a perspective view of a prior art T-38 aircraft.

Military pilots are typically trained in specially designed aircraft commonly referred to as a trainer. FIG. 1 of the drawings shows a T-38 trainer aircraft used primarily by the Air Force. The T-38 has a pair of wings 10 attached to a fuselage 12 below the engine nacelles 14 of the plane. The wings of the T-38 have trailing edge flaps 16 that are used to control the aircraft.

When landing on a short runway, it is desirable to land at the slowest speed possible to reduce the breaking distance of the plane. Reducing the speed of a T-38 during landing requires an increase in the angle of attack, to create a corresponding increase in the lift of the plane. Increasing the angle of attack increases the drag on the plane. Additionally, the larger attack angle reduces the over the nose field-of-view of the pilot. It would be desirable to provide a T-38 which can be landed at lower speeds without increasing the drag or reducing the field-of-view of the pilot. It would also be desirable to generally improve the performance and maneuverability of a T-38 aircraft.

SUMMARY OF THE INVENTION

The present invention is a T-38 trainer aircraft that is modified to have the wings of an F-5 fighter aircraft. The F-5 wings have leading edge flaps which increase aircraft maneuverability and allow the plane to be landed at a lower speed. The F-5 wing is coupled to existing wing joints of the fuselage by fittings which increase the angle of incidence of the aircraft approximately 2°. The increased angle of incidence provides the pilot with a greater over the nose field-of-view. The modified T-38 also has a pair of forward strakes located on the leading edge of the aircraft nacelles. The forward strakes further increase the performance of the plane. Attached to the tail of the aircraft are a pair of aft strakes which counteract the pitch created by the forward strakes.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 16 is a perspective view of a speed brake;

FIG. 17a is a perspective view showing a pair of speed brakes in a retracted position; and, FIG. 17b is a side view showing the pivot location of the speed brakes.

DETAILED DESCRIPTION OF THE INVENTION

Figure 2:
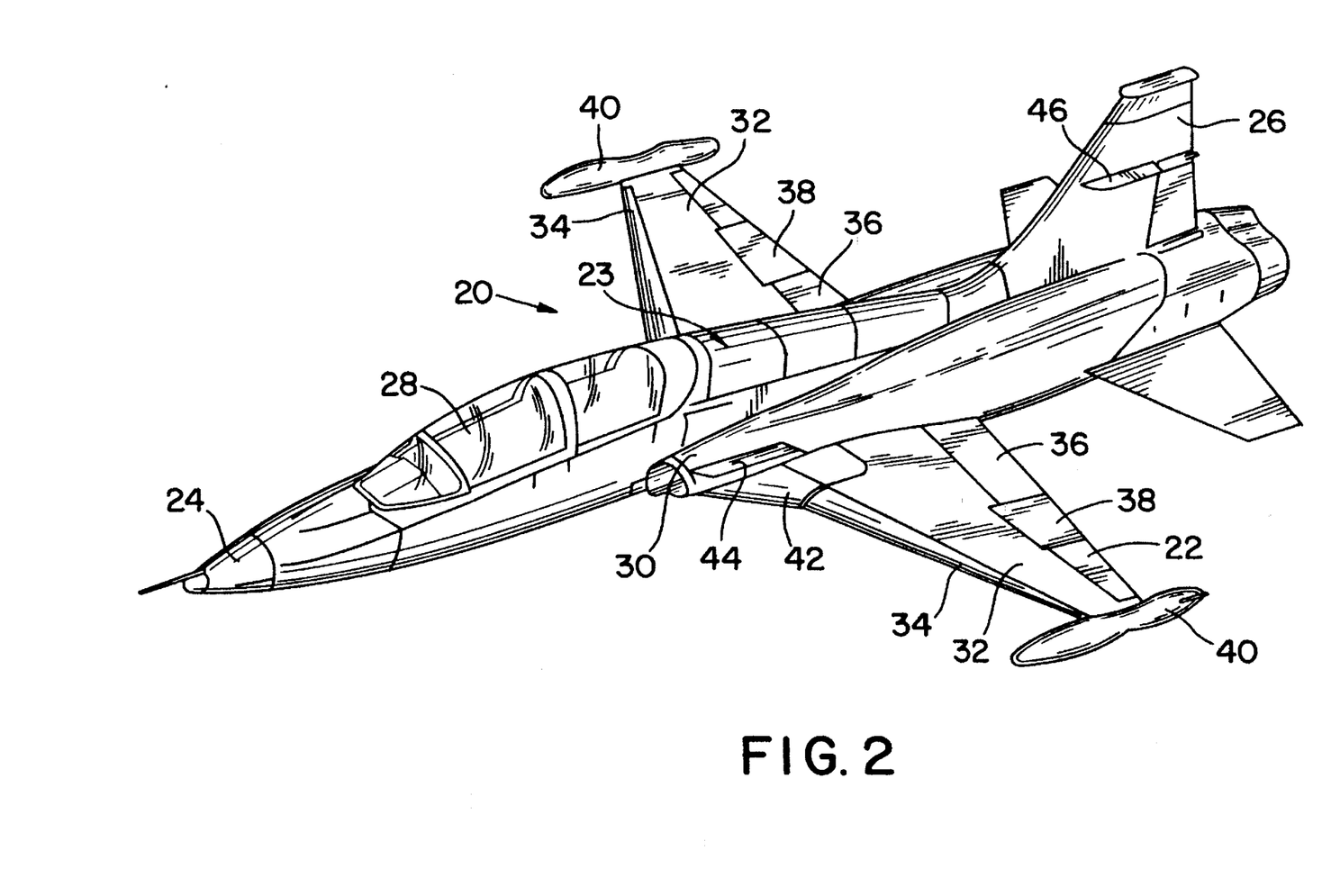
FIG. 2 is a perspective view of a T-38 aircraft modified with F-5 wings.

Referring to the drawings more particularly by reference numbers, FIG. 2 shows a T-38 trainer aircraft 20 modified to contain the wing 22 of an F-5 fighter jet. The aircraft 20 has a fuselage 22 which contains a nose section 24 at the fore end of the plane and a tail 26 located at the aft end of the plane 20. Located near the fore end is a cockpit 28 which contains the pilot(s) of the plane. Extending along each side of the fuselage 22 is an engine nacelle 30.

The wing 22 of the aircraft includes a pair of wing sections 32 that extend from the fuselage underneath the nacelles 30. Each wing section 32 has a leading edge flap 34, a trailing edge flap 36, an aileron 38 and a pylon 40. Additionally, the aircraft 20 has a pair of leading edge extensions 42 attached to the nacelles 30 and wing sections 32 of the plane. The leading edge flaps 34 can be rotated up to 24°. The trailing edge flaps 36 can be rotated up to 20°.

The F-5 wing 22 is to be distinguished from the wing found on existing T-38 aircraft, which do not have leading edge flaps and provide trailing edge flaps that can rotate up to 45°. The single 45° rotation of the T-38 trailing edge flaps has been found to create significant drag when the aircraft is flown at a slower speed and a higher angle of attack. The dual flaps of the F-5 wing provide a wing structure that produces less drag than a T-38 wing, particularly when the aircraft is flown at higher angles of attack. The reduction in drag allows the plane 20 of the present invention to be flown and landed at lower speeds and higher angles of attack than existing T-38 trainer aircraft. For example, the modified T-38 of the present invention can be landed at speeds of approximately 135 knots instead of the conventional T-38 landing speed of 150 knots. The addition of the leading edge flaps 34 of the F-5 wing also increases the maneuverability of the plane.

The aircraft may have a forward strake 44 attached to the leading edge of each engine nacelle 30. The forward strakes 44 reduce fluid separation across the wing sections and increase the coefficient of lift $C_L$ for the aircraft. The plane also has a pair of aft strakes 46 mounted to the tail 26. The aft strakes 46 create a rearward lift which counteracts the pitch created by the forward strakes 44. The aft strakes 46 provide a passive control surface that counteracts the pitch of the forward strakes, without having to add a ballast or vary the controls of the aircraft.

Figure 3:
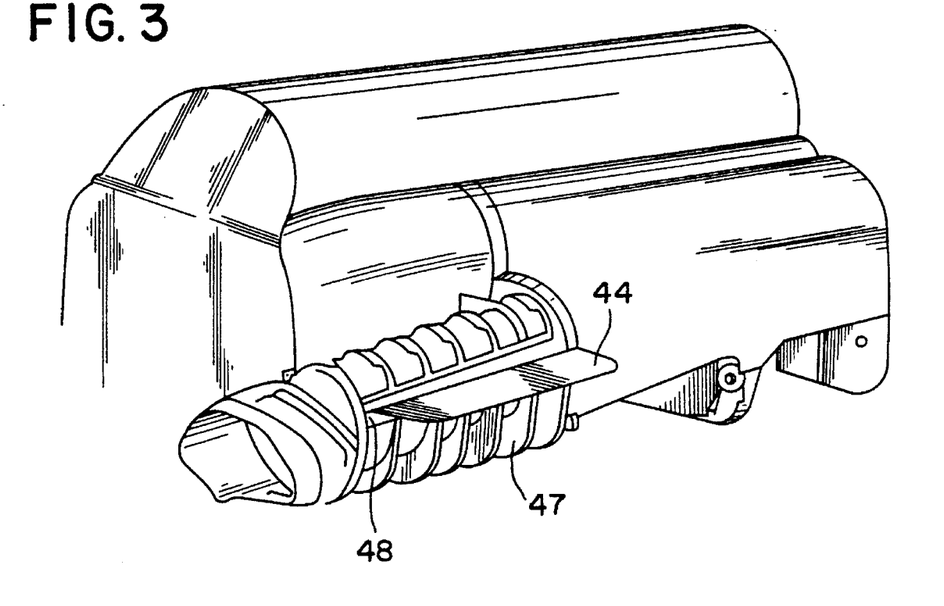
FIG. 3 is a perspective view showing a forward strake attached to the ribs of an engine nacelle.

As shown in FIG. 3, the ribs 47 of the T-38 engine nacelles are reinforced with members 48 to support the load of the forward strakes 44. The aft strakes 46 may also have similar reinforcing structure. In the preferred embodiment, the strakes have have a length of approximately 50 inches, and a width of approximately 11 inches.

Figure 4:
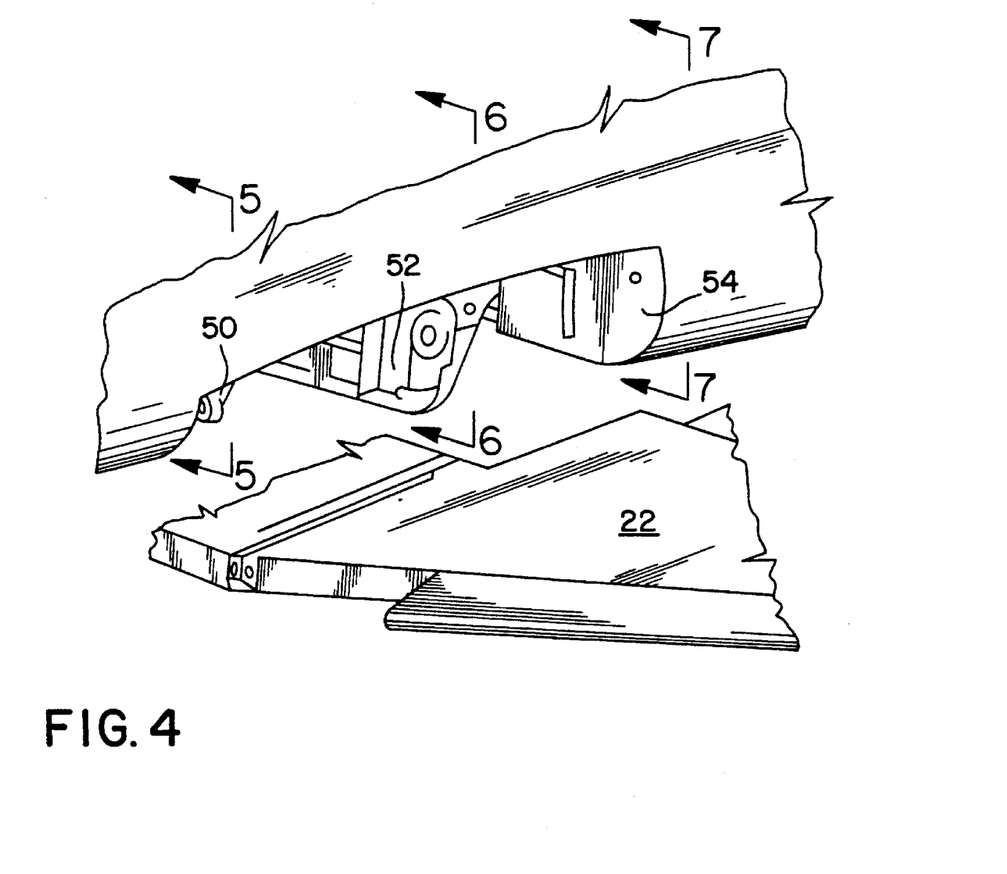
FIG. 4 is a perspective view showing the attachment of a wing to the fuselage of the aircraft.
Figure 5:
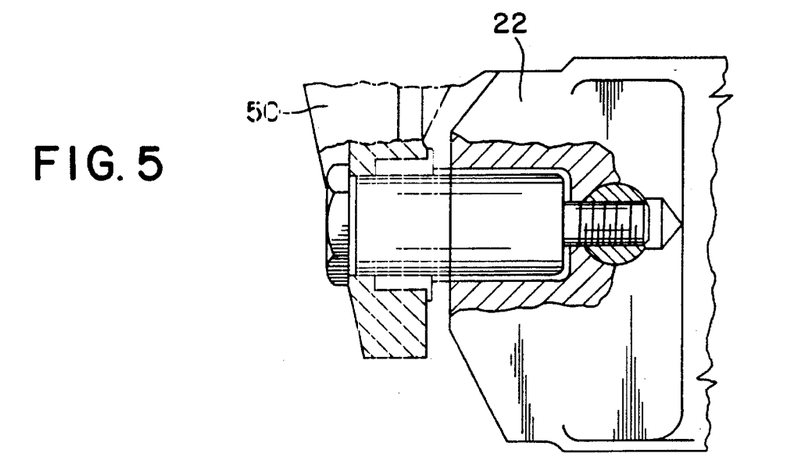
FIG. 5 is a cross-sectional view showing the wing bolted to a fitting at a leading edge attachment point.
Figures 6, 7:
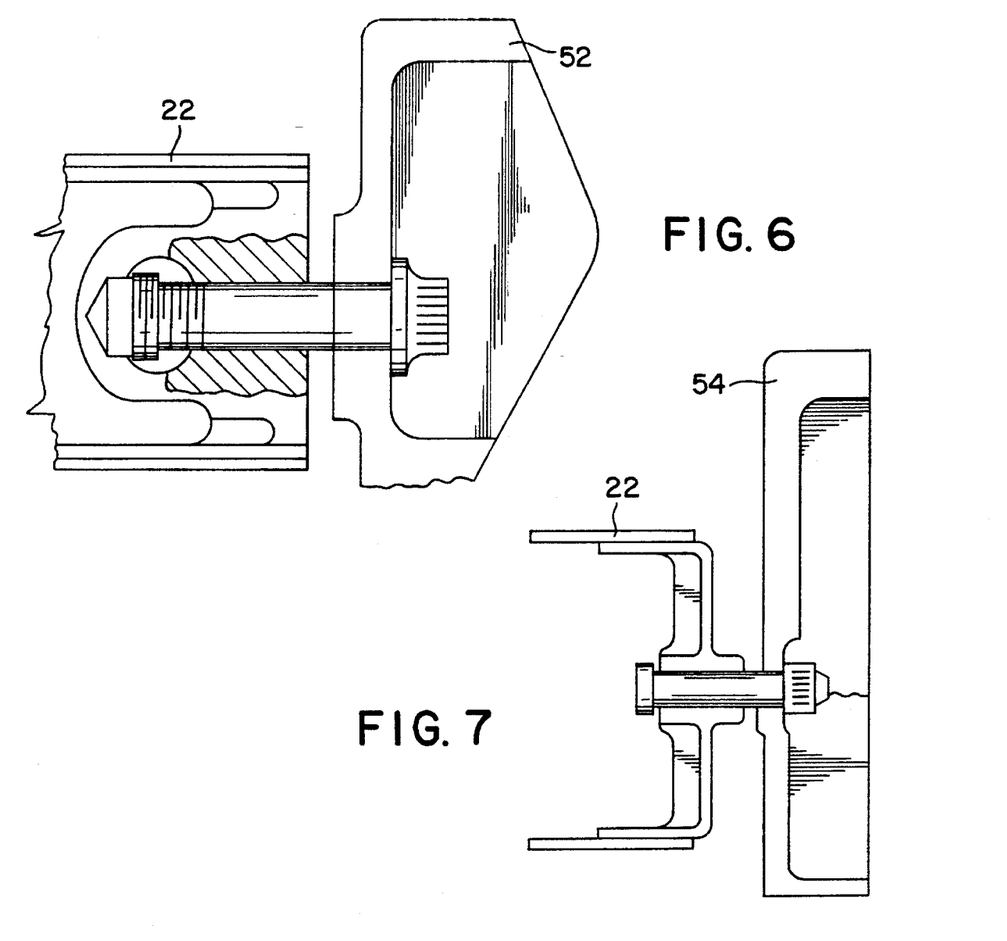
FIG. 6 is a cross-sectional view showing the wing bolted to a fitting at an intermediate attachment point.
FIG. 7 is a cross-sectional view showing the wing bolted to a fitting at a trailing edge attachment point.
Figures 8, 9, 10:
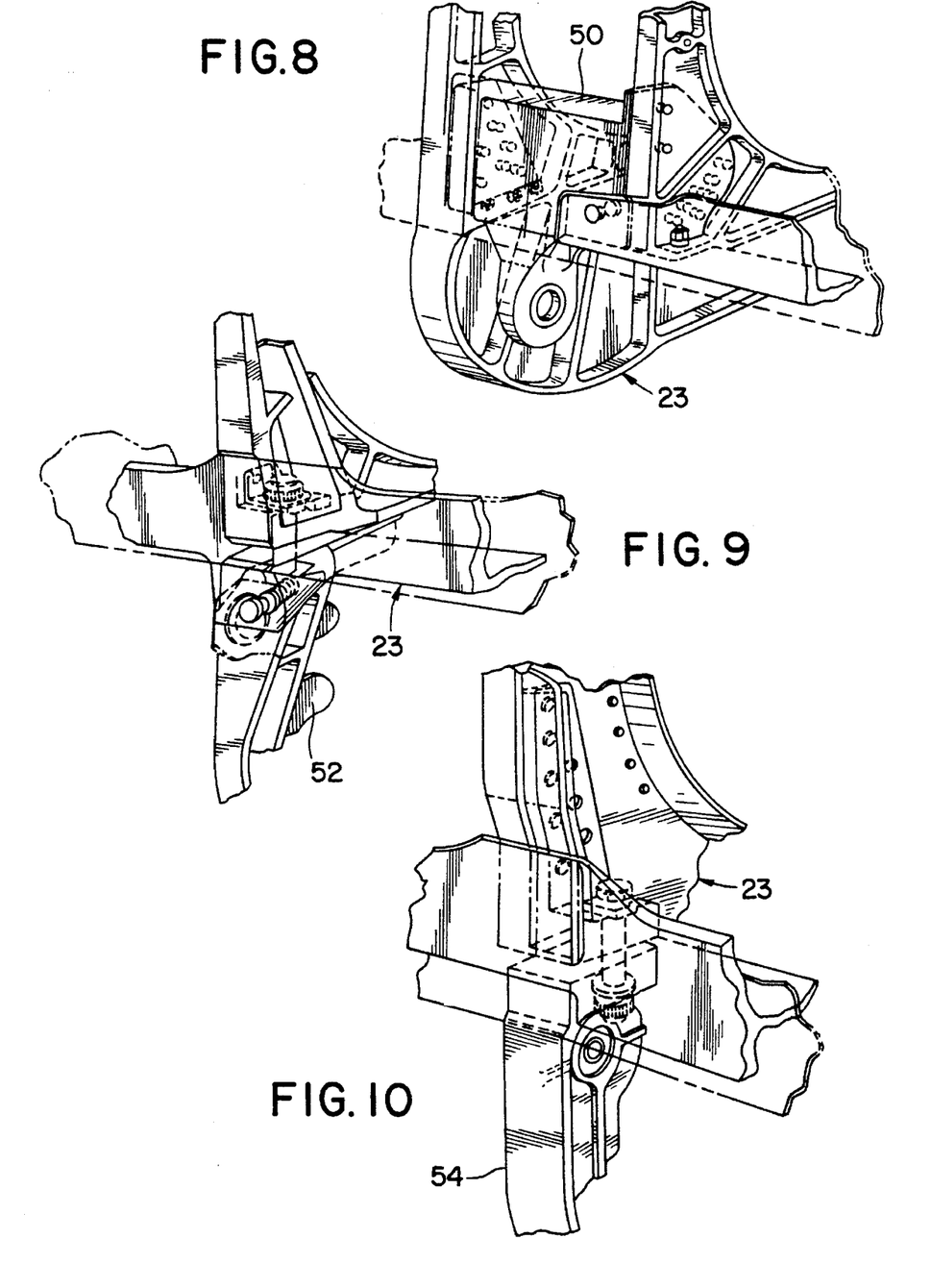
FIG. 8 is a perspective view showing the leading edge fitting attached to the fuselage.
FIG. 9 is a perspective view showing the intermediate fitting attached to the fuselage.
FIG. 10 is a perspective view showing the trailing edge fitting attached to the fuselage.

As shown in FIG. 4, the wing 22 is attached to the fuselage by fittings 50–54. It has been found that the F-5 wing has the same attachment locations as the wing attachment locations of the T-38, thus neither the fuselage of the T-38, or the F-5 wing, have to be modified to create the aircraft of the present invention. FIGS. 5–7 show the three different attachment points of the wing 22 and the fittings 50–54. Each attachment point includes an anchor bolt that extends through the fitting and is screwed into a threaded aperture in the wing structure. FIGS. 8–10 show the attachment locations of the fittings 50–54 onto the fuselage 22.

Figure 11:
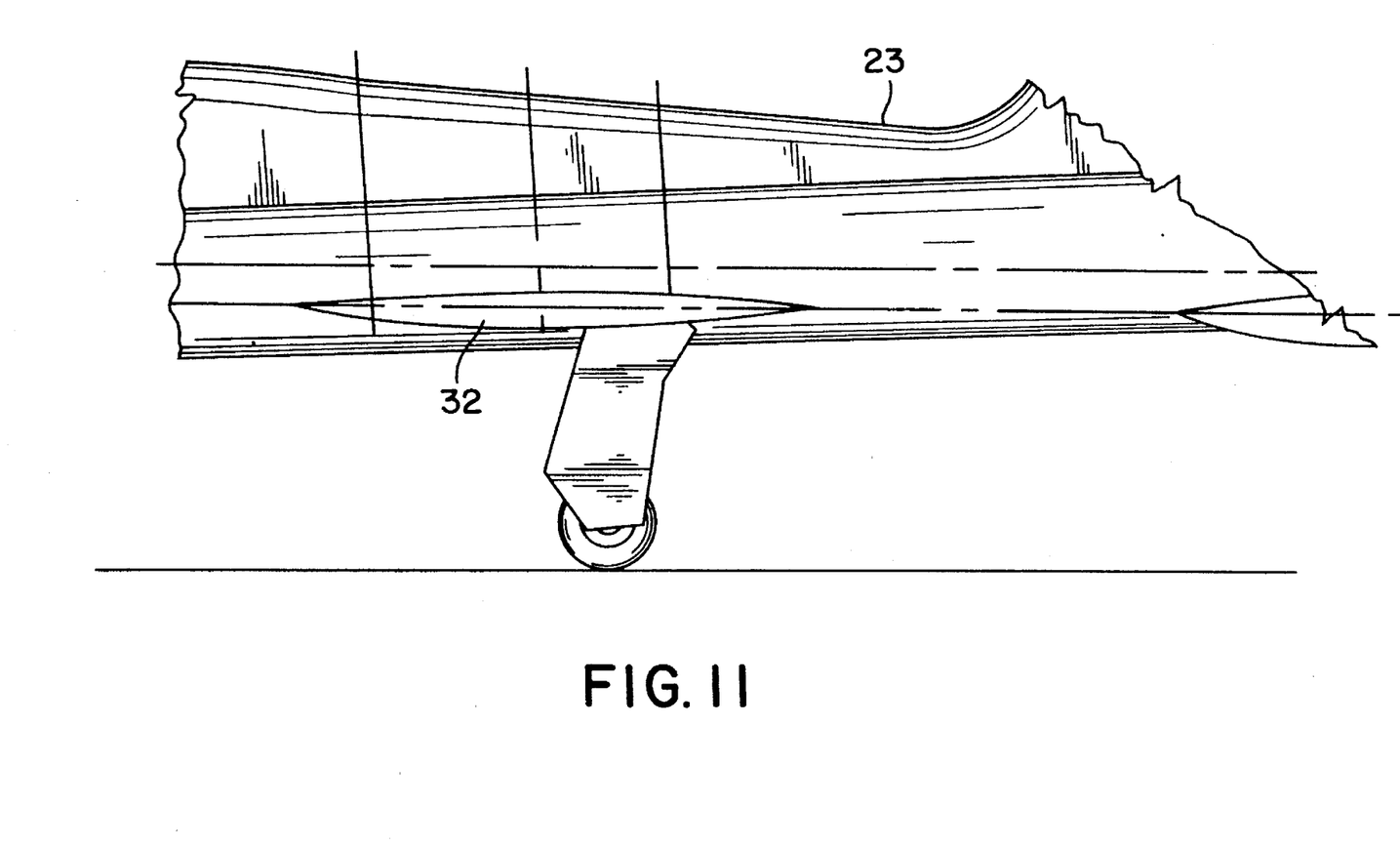
FIG. 11 is a side view of the aircraft showing the angle of incidence of the wing.

In the preferred embodiment, the fittings 50–54 are modified to increase the angle of incidence of the plane. As shown in FIG. 11, the angle of incidence is changed so that the leading edge of the wing is rotated in an upward direction. This upward rotation of the wing has the effect of rotating the nose in a downward direction. Rotating the nose downward increases the over the nose field of view for the pilot. This is particularly advantageous when landing the aircraft at reduced speeds. The decrease in speed requires the plane to be flown at a higher angle of attack. The higher angle of attack may reduce the field-of-view of the pilot. The change in the angle of incidence compensates for the higher angle of attack by lower the nose, thereby providing the pilot with a larger below the nose field of view. In the preferred embodiment, the increase in the angle of incidence is 2°.

The angle of incidence is preferably accomplished by modifying the fitting 50–54 so that the wing is attached to the fuselage at a larger angle. The T-38 is modified by first removing the existing wing fittings of the aircraft. Modified fitting 50–54 are then attached to the fuselage 22 and the wing 32 is mounted to the fittings. The new fittings change the angle of incidence of the plane.

Figure 12:
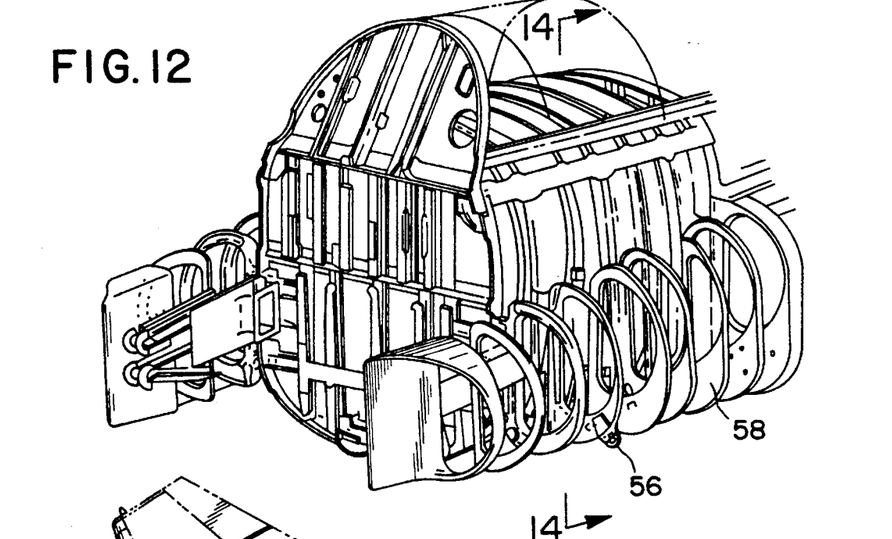
FIG. 12 is a perspective view showing a leading edge extension support lug attached to the ribs of an engine nacelle.
Figures 13, 14:
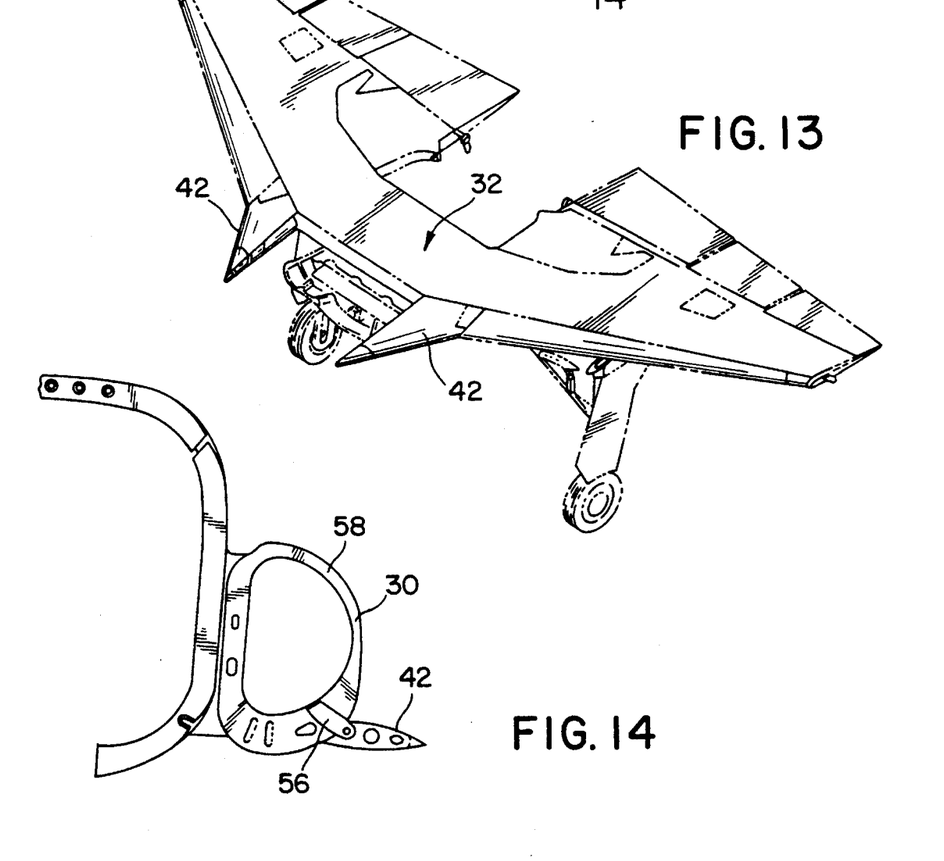
FIG. 13 is a perspective view of an F-5 wing with a pair of leading edge extensions.
FIG. 14 is a front cross-sectional view showing a leading edge extension attached to the engine nacelle.

As shown in FIGS. 12–14, a pair of leading edge extensions 42 are attached to the wing 32 and the engine nacelles 30. The leading edge of the extensions are mounted to lugs 56 that are attached to the ribs 58 of the nacelles. The leading extensions 42 provide a fairing structure for the wing 32.

Figure 15:
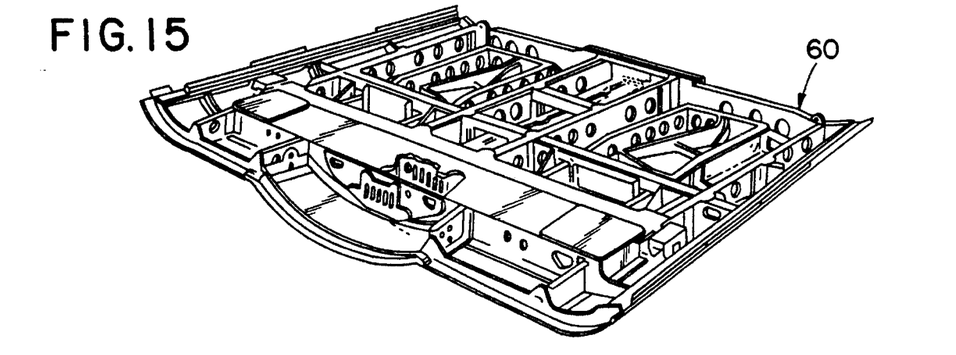
FIG. 15 is a perspective view of a brake support panel.

It has been found that the speed brake assembly of the T-38 must be changed to compensate for the variation in the angle of incidence. Both the brake support panel 60 shown in FIG. 15 and the speed brake 62 shown in FIG. 16 must be redesigned to have a more shallow depth. The modified brake panel and speed brakes replace the existing corresponding parts of the T-38. For a 2° change in the angle of incidence, it has been found that the support panel 60 and speed brakes 62 should be modified to have a depth that is 1.2 inches less than the depth of existing T-38 support panels and speed brakes.

Figures 16, 17A, 17B:
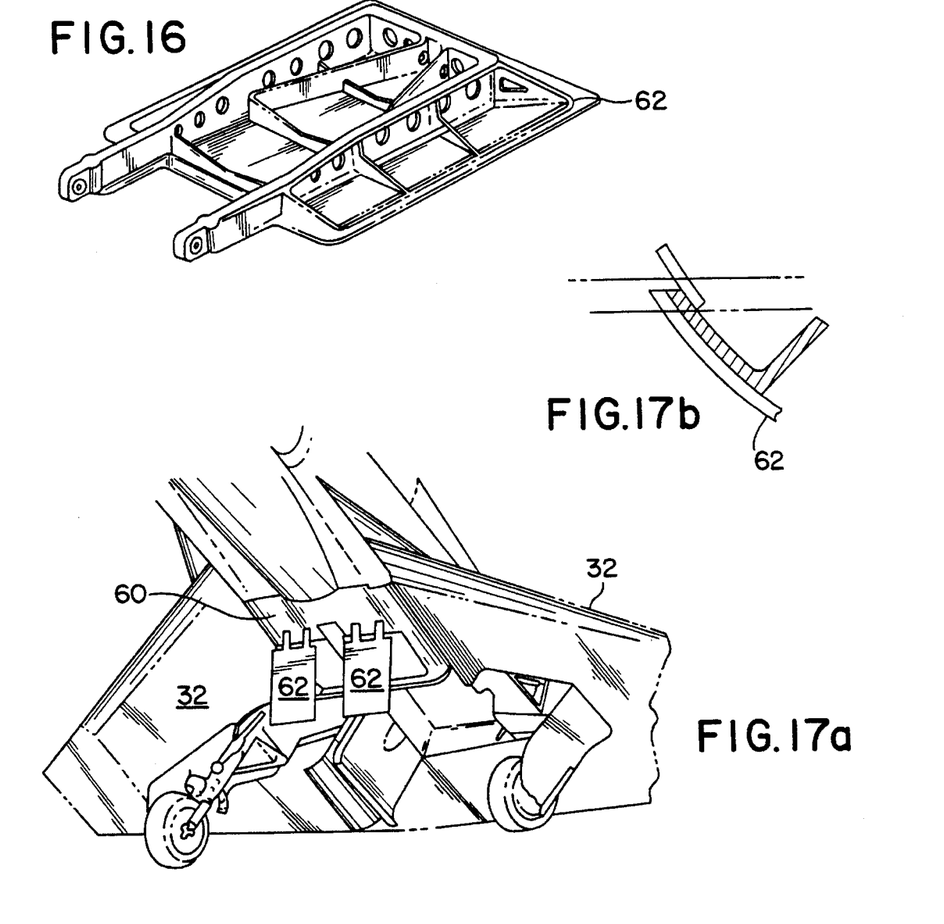

As shown in FIGS. 17a–b, in the preferred embodiment, the speed brakes 62 are attached to the support panel 60 at a different pivot point than the pivot point of a conventional T-38 aircraft. The pivot point is changed so that the effective drag of the speed brakes for a plane with a 2° angle of incidence is the same as the effective brake drag of a plane with a 0° angle of incidence.

The present invention thus provides a method for retrofitting an existing T-38 aircraft to include the wings of a F-5, without modifying the fuselage of the T-38, or the F-5 wing. The resulting modified T-38 provides an aircraft that has less drag, greater maneuverability and a lower landing speed than existing T-38 aircraft.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for modifying an existing aircraft, comprising the steps of:

a) providing an aircraft which has a wing attached to a fuselage which has a tail and a pair of nacelles each located at a wing root section of said fuselage, said aircraft also having a plurality of wing fittings that establish a wing angle of incidence;

b) removing said wing from said fuselage;

c) removing said wing fittings from said fuselage;

d) attaching a plurality of new wing fittings to said fuselage;

e) attaching a new wing to said new wing fitting, said new wing having a leading edge flap at a leading edge of said new wing and a trailing edge flap at a trailing edge of said new wing, wherein said new wing fittings change the wing angle of incidence approximately 2°; and, f) attaching a pair of leading edge extensions to said new wing and to said nacelles.

2. The method as recited in claim 1, further comprising the step of attaching a pair of forward strakes to said nacelles.

3. The method as recited in claim 1, further comprising the steps of removing a plurality of wing fittings from said fuselage and attaching new wing fittings to said fuselage, after said wing is removed from said fuselage and before said new wing is attached to said fuselage, wherein said new wing fittings change a wing angle of incidence approximately 2°.

4. The method as recited in claim 3, further comprising the steps of removing a brake support panel and a pair of speed brakes from said fuselage, and attaching a new brake support panel and a new pair of speed brakes that change a pivot point of said brakes.

5. The method as recited in claim 2, further comprising the step of attaching a pair of aft strakes to said tail.

6. The method as recited in claim 1, further comprising the steps of removing a brake support panel and a pair of speed brakes from said fuselage, and attaching a new brake support panel and a new pair of speed brakes that change a pivot point of said brakes.

7. A method of modifying an existing aircraft, comprising the steps of:

a) providing an aircraft which has a wing attached to a fuselage which has a tail and a pair of nacelles each located at a wing root section of said fuselage, said aircraft further having an horizontal stabilizer located at a top end of said tail;

b) removing said wing from said fuselage;

c) attaching a new wing to said fuselage, said new wing having a leading edge flap at a leading edge of said new wing, and a trailing edge flap at a trailing edge of said new wing;

d) attaching a pair of leading edge extensions to said new wing and to said nacelles;

e) attaching a pair of forward strakes to said nacelles;

f) attaching a pair of aft strakes to said tail at a location between said fuselage and said horizontal stabilizer.

* * * * *